United States Patent [19]

Czernakowski

[11] Patent Number: 5,409,294
[45] Date of Patent: Apr. 25, 1995

[54] CHILD'S SAFETY DEVICE

[75] Inventor: Waldemar Czernakowski, Blaustein, Germany

[73] Assignee: Britax Romer Kindersicherheit GmbH, Germany

[21] Appl. No.: 73,761

[22] Filed: Jun. 8, 1993

[30] Foreign Application Priority Data

Jan. 23, 1993 [GB] United Kingdom ............... 9301342

[51] Int. Cl.6 ............................................. A47D 1/10
[52] U.S. Cl. ............................... 297/250.1; 297/452.4
[58] Field of Search ............... 297/250.1, 256.1, 452.4

[56] References Cited

U.S. PATENT DOCUMENTS

| 2,825,785 | 9/1958 | Mikola | 297/250.1 |
| 3,316,018 | 4/1967 | Stith | 297/452.40 |
| 4,099,770 | 7/1978 | Elsholz et al. | 297/250.1 |
| 4,275,923 | 7/1981 | Molnar | 297/250.1 |
| 4,603,903 | 8/1986 | Moscovitch | |

Primary Examiner—John T. Kwon
Attorney, Agent, or Firm—Davis, Bujold & Streck

[57] ABSTRACT

A safety device for enabling a child to use an adult vehicle seat belt, comprises a cushion including a base having an upper surface for seating engagement by an occupant. The cushion also has two side parts each of which includes a respective side wall. The two parts are slidable relative to one another so as to enable the distance between the side walls to be varied.

19 Claims, 6 Drawing Sheets

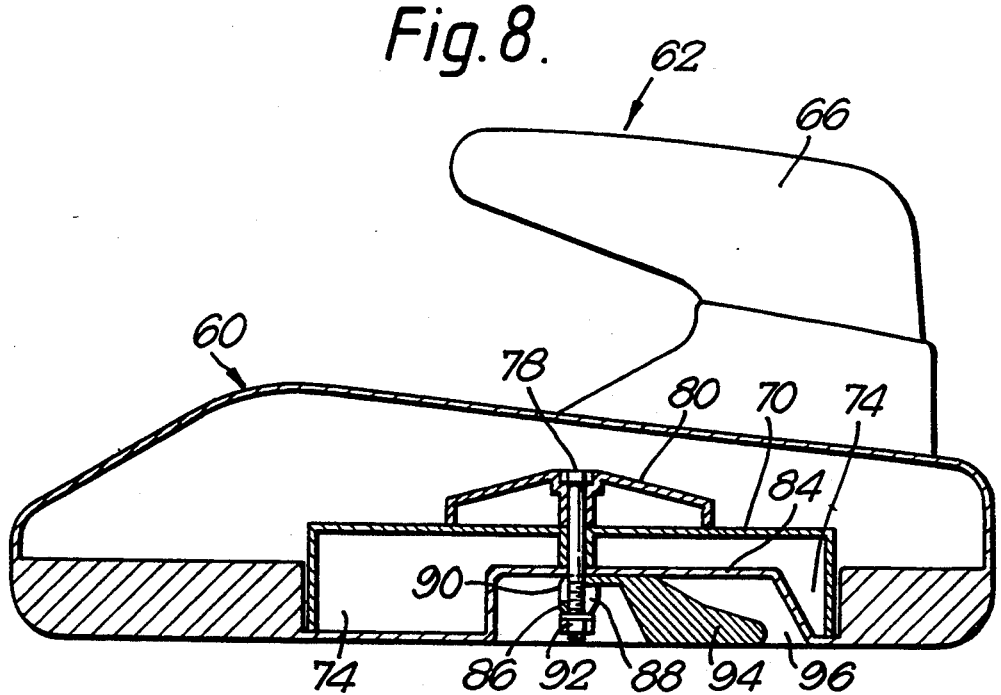
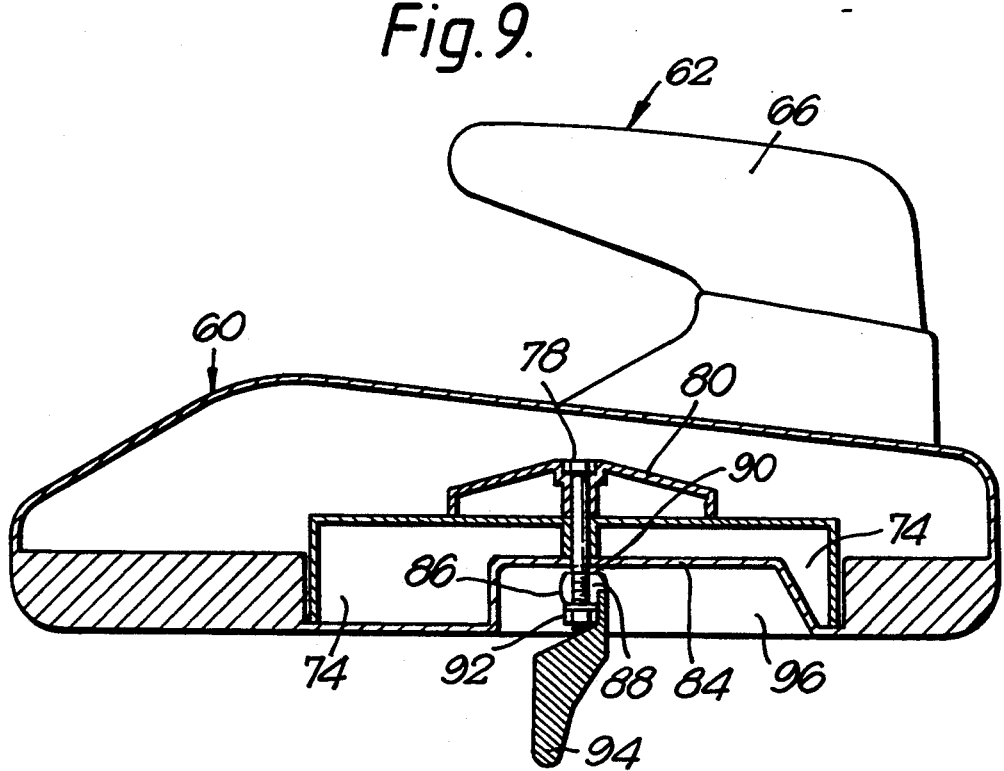

CHILD'S SAFETY DEVICE

FIELD

This invention relates to a safety device for enabling a child to use an adult vehicle seat belt, comprising a cushion having a seating surface for seating engagement by an occupant, a respective side wall upstanding from each of two opposite sides of the seating surface and means for varying the distance between the two side walls to enable the safety device to be adjusted for use by children of different ages.

RELATED ART

A safety device of this type is disclosed in US-A4603903. The base and the two side walls are separate components which can be taken apart and reassembled in a variety of configurations so as to vary both the height of the upper surface of the base and the distance between the side walls simultaneously. There is an obvious risk of malfunction due to incorrect assembly. It is an object of the invention to provide a safety device of the type described above in which the distance between the side walls can be varied without necessarily altering the height of the upper surface is not subject to the risk of incorrect assembly.

SUMMARY OF THE INVENTION

According to the invention, in a safety device of the type described above, the cushion has two side parts each of which includes a respective side wall, the two parts being slidable relative to one another so as to enable the distance between the side walls to be varied.

In one form of the invention, each of the two side parts is slidably coupled to a third central part.

BRIEF DESCRIPTION OF THE DRAWINGS

FIG. 8 is a sectional view taken on the line 8—8 in FIG. 6;

FIG. 9 is a sectional view, similar to FIG. 8, but with a clamp in its released position.

DETAILED DESCRIPTION OF THE PREFERRED EMBODIMENT

Figure 1:
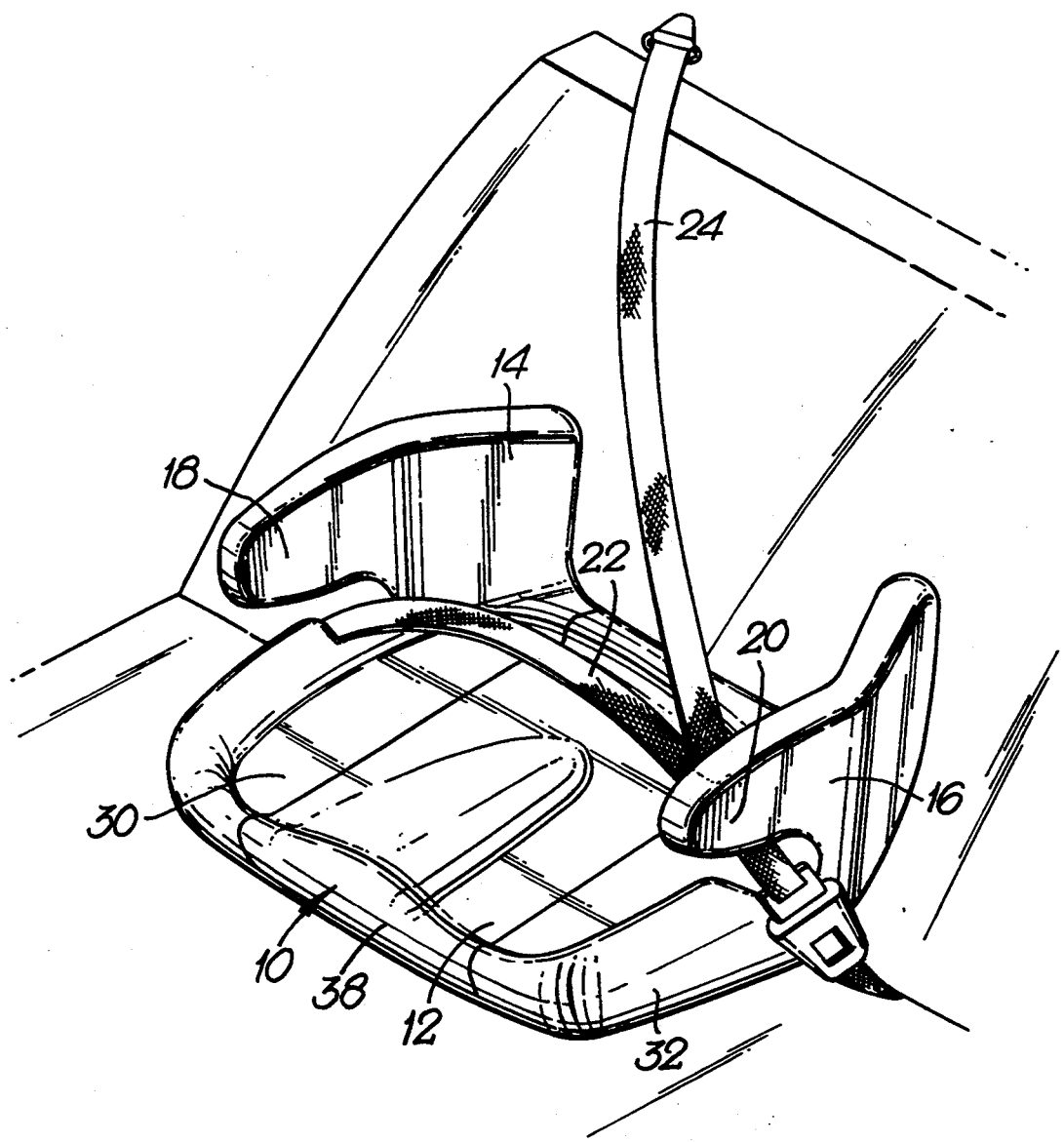
FIG. 1 is a perspective view of an embodiment of the invention shown located on a vehicle seat.
Figure 2:
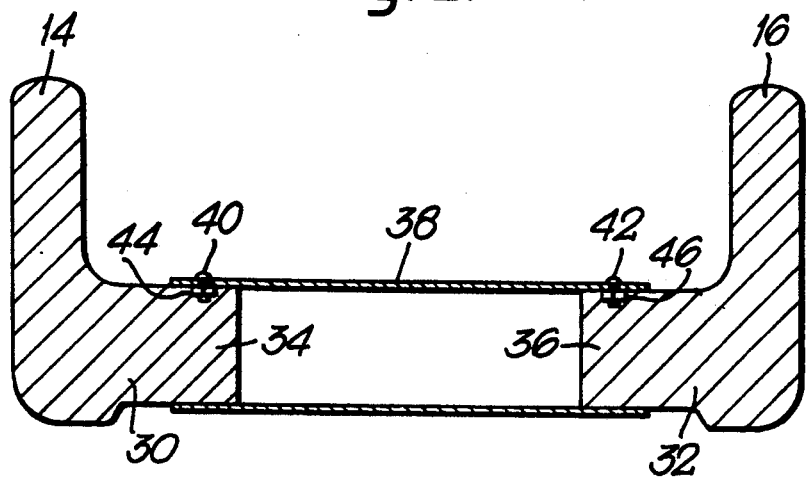
FIG. 2 is a transverse sectional view of the embodiment shown in FIG. 1.

In FIGS. 1 and 2, a safety cushion 10 has the upper surface 12 of its base contoured to provide a comfortable seating surface for an occupant. Upstanding side walls 14 and 16 are provided at each of two opposite sides of the base. The side walls 14 and 16 have respective forwardly projecting upper parts 18 and 20 which bound slots for receiving the lap portion 22 of an adult seat belt, the shoulder portion 24 also passing under the protecting portion 20.

In accordance with the invention, the base of the device 10 is formed in three parts, side parts 30 and 32 being integral with respective side walls 14 and 16 and having spigots 34 and 36 which project within a hollow central part 38. Screws 40 and 42 which project through laterally extending slots in the central part 38 into engagement with nuts 44 and 46 within the side parts 30 and 32, allow the three parts of the base to be secured together with the walls 14 and 16 spaced apart by a range of distances.

Figure 3:
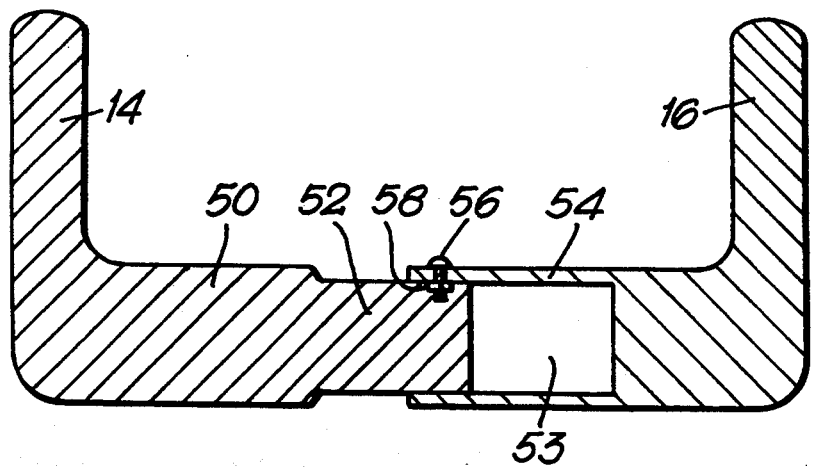
FIG. 3 is a transverse sectional view, similar to FIG. 2, of a second embodiment of the invention.
Figure 4:
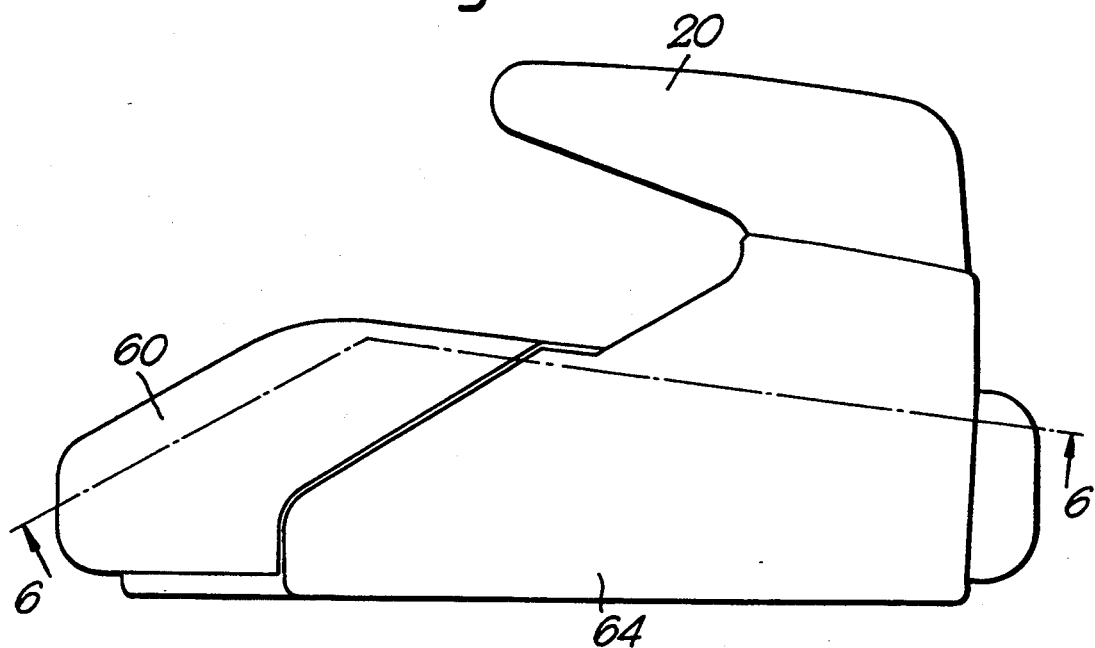
FIG. 4 is a side view of a third embodiment of the invention, with the side walls at a minimum distance from one another.
Figure 5:
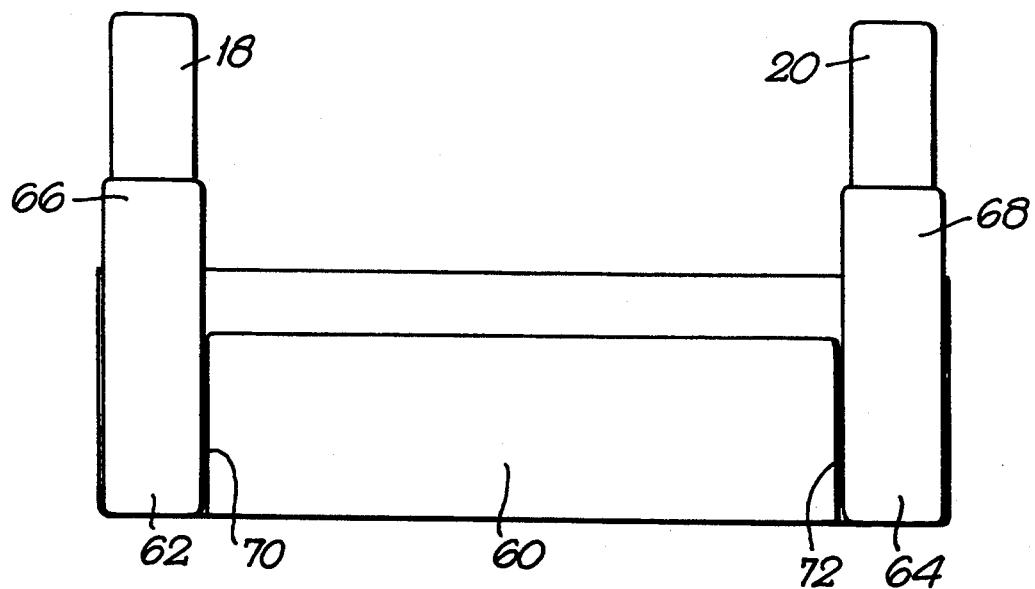
FIG. 5 is a rear view of the embodiment shown in FIG. 4, with the side walls at a minimum distance from one another.
Figure 6:
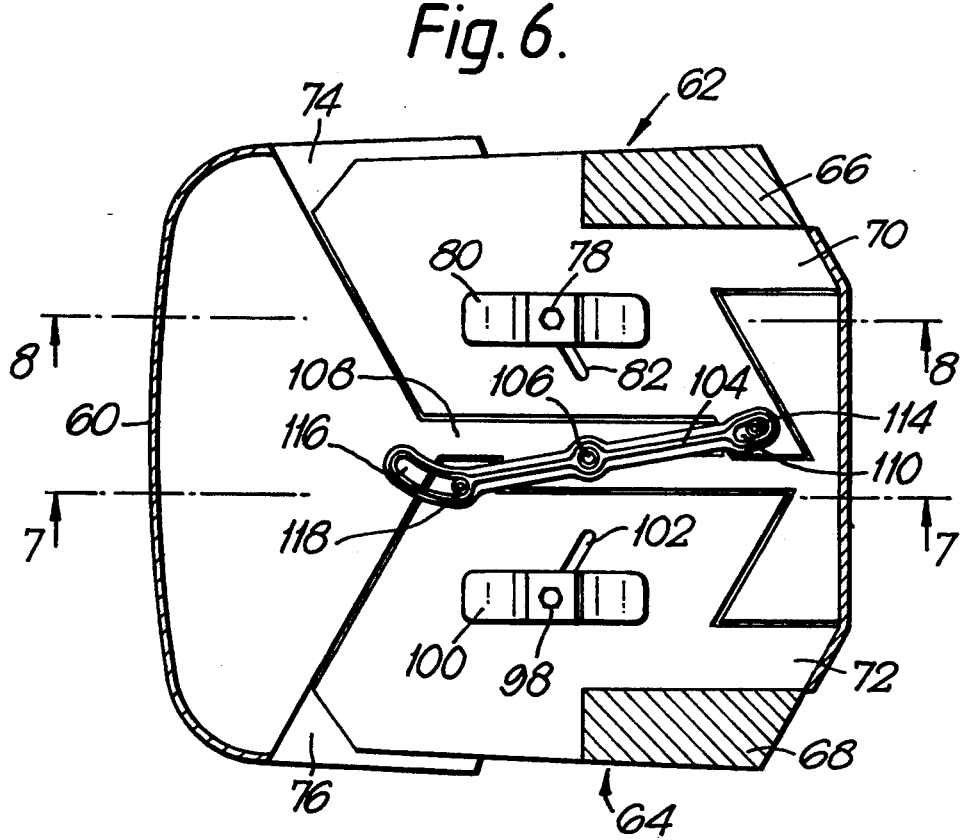
FIG. 6 is a sectional view taken on the line 6—6 in FIG. 4.
Figure 7:
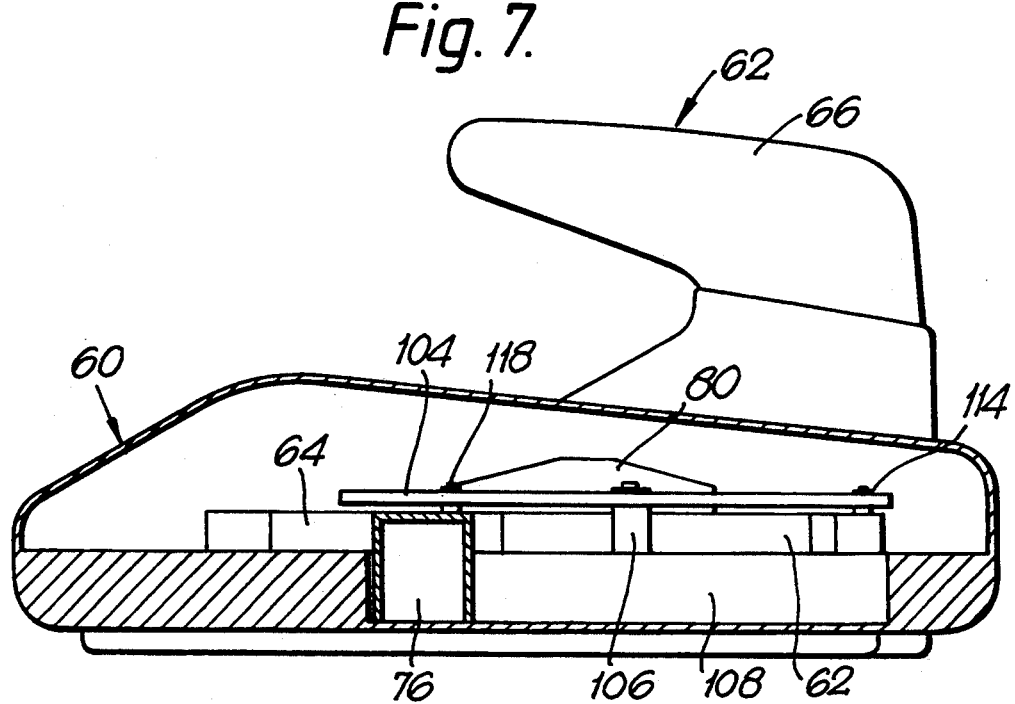
FIG. 7 is a sectional view taken on the line 7—7 in FIG. 6.
Figure 10:
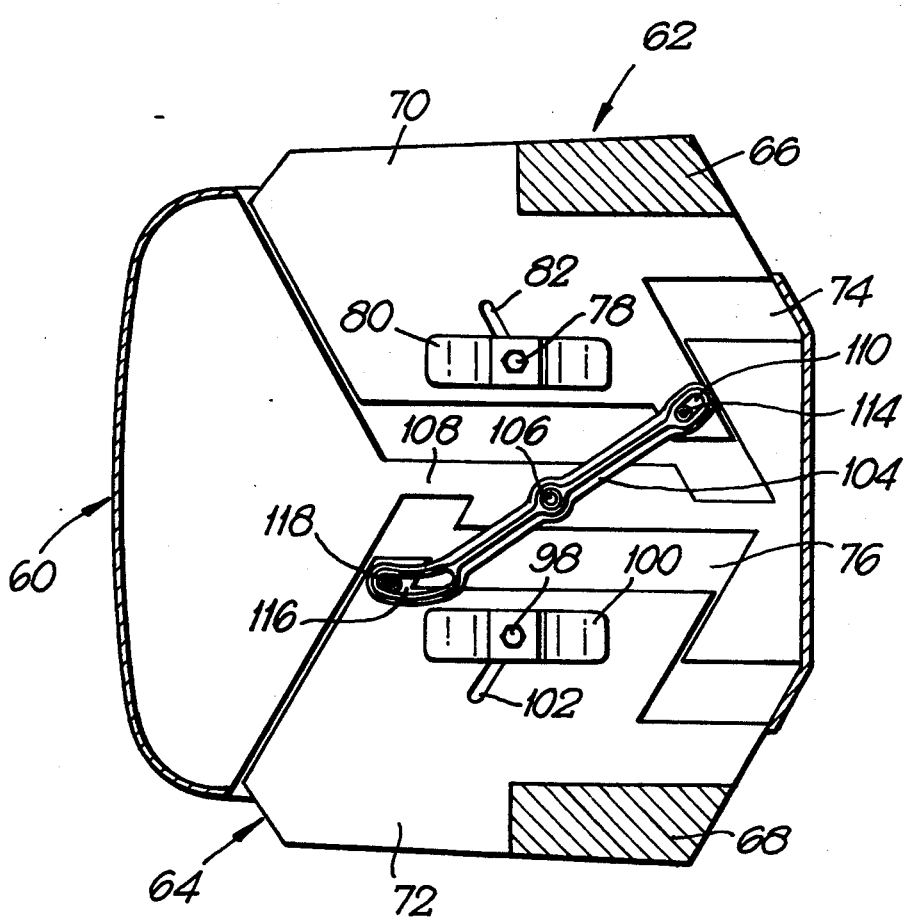
FIG. 10 is a sectional view similar to FIG. 6, but with the side walls at a maximum distance from one another.

FIG. 3 illustrates an alternative embodiment in which the base of the safety device is in only two parts, the side wall 14 being formed integrally with a first part 50 which has a spigot 52 slidably engaging in a socket 53 formed in a second part 54. A screw 56 projects through a slot in the hollow part 54 into engagement with a nut 58 secured within the spigot 52.

With either of the foregoing embodiments, it is merely necessary to slacken the screws 40, 42 or 56 to allow the width between the side walls 14 and 16 to be varied. Preferably the screws 40, 42 and 56 are captive so that they cannot inadvertently be removed.

FIGS. 4 to 10 show a further embodiment of the invention comprising a central part 60 and side parts 62 and 64. Each of the side parts 62 and 64 is generally L-shaped, having a vertical portion 66, 68 constituting a respective side wall of the same general shape as the side walls 14 and 16 of FIG. 1, and a respective horizontal portion 70, 72 which is received in a respective recess 74, 76 in opposite sides of the central part 60. As can be seen from FIGS. 6 and 10, the recesses 74 and 76 are oriented obliquely so that the side parts 62 and 64 are slidable forwardly and outwardly relative to the central part 60.

The side part 62 is held captive on the central part 60 by a stud 78 which projects downwardly through a hole in a clamping member 80, a slot 82 in the horizontal portion 70 of the side part 62 and a hole in a bottom wall 84 (FIGS. 8 and 9) of the recess 74. A generally cylindrical clamping member 86 has a flat 90 on one side face and a transverse hole, the cross-section of which is considerably larger than the diameter of the stud 78, through which the stud 78 projects. A nut 92 retains the clamping member 86 on the stud 78.

A handle 94 projects from the clamping member 86 opposite to the flat 90. When the clamping member 86 is oriented as shown in FIG. 8, so that the handle 94 is received in a recess 96 in the bottom of the central part 70 below the wall 84, and the full diameter of the clamping member 86 is positioned between the nut 92 and the wall 84, the horizontal portion 70 of the side part 62 is firmly clamped between the clamping member 80 and the top of the wall 84. When the handle 94 is pivoted downwardly out of the recess 96 as illustrated in FIG. 9, the flat 90 confronts the wall 84, thus relieving the clamping force exerted by the clamping member 80 and freeing the horizontal portion 70 to slide outwardly in its recess 74. Since the handle 94 now projects substantially below the bottom of the central part 60, the safety cushion cannot be positioned flat on a car seat until the handle 94 has been folded back to the position illustrated in FIG. 8 so as to re-engage the clamping member 86.

The other side part 64 is secured to the central part 60 by a similar arrangement, involving a stud 98, a clamping member 100 and an oblique slot 102 in the horizontal portion 72 of the side part 64.

In order to ensure that the two side parts 62 and 64 move relative to the central part 60 simultaneously with one another, a synchronising lever 104 is pivotally mounted on a stud 106 which projects from a central portion 108 separating the inner ends of the two side recesses 74 and 76 in the base part 60. The synchronising lever 104 has a straight slot 110 at its rear end which is engaged by a stud 114 secured to the horizontal portion 70 of the side part 62. The synchronising lever 104 also has an arcuate slot 116 at its front end which is engaged by a stud 118 secured to the central part 72 of the side part 64. The arcuate slot 116 is shaped to compensate for the angle between the trajectories of the two side parts and ensure that they move at an equal rate.

Although the central part 60 is illustrated as being formed in one piece, in practice it will usually be more convenient to form it as separate upper and lower moulded parts.

I claim:

1. A safety device for enabling a child to use an adult vehicle seat belt, comprising a cushion having:
    a central part with a seating surface for seating engagement by an occupant,
    two side parts each of which includes a respective side wall upstanding from each of two opposite sides of a base, the two parts being slidably coupled to the central part so as to enable the distance between the side walls to be varied, and
    coupling means interconnecting the two side parts for simultaneous movement in opposite directions relative to the central part.

2. A safety device according to claim 1, wherein the coupling means comprises a lever pivotally mounted on the central part and having each end connected to a respective side part by camming means.

3. A safety device according to claim 2, further comprising clamping means for restraining relative sliding movement of the side walls.

4. A safety device according to claim 3, wherein the clamping means includes blocking means arranged to project below the bottom of the cushion when the clamping means is released.

5. A safety device according to claim 4, wherein the blocking means comprises a manually operable actuating lever for the clamping means.

6. A safety device according to claim 1, further comprising clamping means for restraining relative sliding movement of the side walls.

7. A safety device according to claim 6, wherein the clamping means includes blocking means arranged to project below the bottom of the cushion when the clamping means is released.

8. A safety device according to claim 7, wherein the blocking means comprises a manually operable actuating lever for the clamping means.

9. A safety device comprising a cushion in combination with a vehicle seat provided with a lap and shoulder adult vehicle seat belt, the cushion having:
    a central part with a seating surface for seating engagement by an occupant; two side parts each of which includes a respective side wall upstanding from each of two opposite sides of the base, the two parts being slidably coupled to the central part so as to enable the distance between the side walls to be varied;
    clamping means for restraining relative sliding movement of the side walls; and
    means in each said side wall for engagement with the lap portion of said safety belt to hold the cushion on the vehicle seat.

10. A safety device according to claim 9, wherein the clamping means includes blocking means arranged to project below the bottom of the cushion when the clamping means is released.

11. A safety device according to claim 10, wherein the blocking means comprises a manually operable actuating lever for the clamping means.

12. A safety device comprising:
    a cushion, with a seating surface for seating engagement by an occupant:, in combination with a vehicle seat provided with a lap and should adult vehicle seat belt, the cushion having:
    a central part;
    two side parts each of which includes a respective side wall upstanding from each of two opposite sides of the base, the two parts being slidably coupled to the central part so as to enable the distance between the side walls to be varied; and
    coupling means interconnecting the two side parts for simultaneous movement in opposite directions relative to the central part.

13. A safety device according to claim 12, wherein the coupling means comprises a lever pivotally mounted on the central part and having each end connected to a respective side part by camming means.

14. A safety device according to claim 13, further comprising clamping means for restraining relative sliding movement of the side walls.

15. A safety device according to claim 14, wherein the clamping means includes blocking means arranged to project below the bottom of the cushion when the clamping means is released.

16. A safety device according to claim 15, wherein the blocking means comprises a manually operable actuating lever for the clamping means.

17. A safety device according to claim 12, further comprising clamping means for restraining relative sliding movement of the side walls.

18. A safety device according to claim 17, wherein the clamping means includes blocking means arranged to project below the bottom of the cushion when the clamping means is released.

19. A safety device according to claim 18, wherein the blocking means comprises a manually operable actuating lever for the clamping means.

* * * * *